US006862037B2

(12) United States Patent
Lin

(10) Patent No.: US 6,862,037 B2
(45) Date of Patent: Mar. 1, 2005

(54) IMAGE TRANSMITTING BALL-POINT PEN

(76) Inventor: Sheng Tien Lin, 12F-3, 888, Ching Kuo Road, Taoyuan (TW)

( * ) Notice: Subject to any disclaimer, the term of this patent is extended or adjusted under 35 U.S.C. 154(b) by 345 days.

(21) Appl. No.: 10/253,700

(22) Filed: Sep. 25, 2002

(65) Prior Publication Data

US 2004/0056949 A1 Mar. 25, 2004

(51) Int. Cl.[7] .................................................. H04N 7/18

(52) U.S. Cl. ........................ 348/151; 348/207; 348/143; 348/158; 345/180; 345/179; 708/141; 178/17 R; 178/18.01

(58) Field of Search ................................. 348/151, 207, 348/143, 158; 345/179, 180; 708/141; 178/17 R, 18.01

(56) References Cited

U.S. PATENT DOCUMENTS 5,661,506 A * 8/1997 Lazzouni et al. ........... 345/179
2001/0025289 A1 * 9/2001 Jenkins et al. .............. 708/141
2002/0175903 A1 * 11/2002 Fahraeus et al. ............ 345/179
2003/0137588 A1 * 7/2003 Wang et al. ........... 348/207.99

* cited by examiner

*Primary Examiner*—Shawn S. An
(74) *Attorney, Agent, or Firm*—Troxell Law Office, PLLC

(57) ABSTRACT

An image transmitting ball-point pen mainly consists of a battery compartment, a lower body, an extension tube and a tapered cap located at the terminal end of the extension tube which serves to fix a turning sleeve and an outer tube onto the extension tube. The turning sleeve has two slide grooves and a plurality of slots which are employed to contain the protrusions on the interior of the outer tube. The upper end of the transmitting plate is placed between two locating strips and the lower end of the transmitting plate extends downward to the locating grooves and the turning sleeve where it is locked by a lock pin passing through the slide channel and the locating grooves. When the outer tube is being turned, the turning action makes the transmitting plate a right or left movement as well as an up or down movement, so it further makes the ink cartridge which works as an antenna extending or retracting along the tapered cap.

5 Claims, 7 Drawing Sheets

IMAGE TRANSMITTING BALL-POINT PEN

FIELD OF THE INVENTION

The present invention is related to an image transmitting ball-point pen having functions of image pick-up, sound recording and transmission, in particular refers to the type that can not only work as a writing tool, but is also conveniently portable, and can be employed for photo taking and monitoring all the time. Besides, a metal ink cartridge is employed as the antenna to contact with the transmitting plate, which takes least space but gains high stability of signals.

BACKGROUND OF THE INVENTION

In most cases, the monitoring cameras or the image transfers for medical inspection are a bulky build or a fixed type with smaller cameras, hardly suitable for mobile operation.

The image transmitting ball-point pen of the present invention is operable within a fixed range to carry out the scanning and photo taking around the environment, the spot surveillance, inspection of skin and teeth in medical operation, scanning and reproduction of photos and pictures, and can be connected with the computer system as an input source for images and data.

The special characteristics of the image transmitting ball-point pen of the invention lies on that the metal ink cartridge is employed as an antenna to contact with the transmitting plate, which takes least space but gains high stability of signals. The transmitting plate is placed between two locating strips and locked by a lock pin passing through the slide channel on the turning sleeve and the locating grooves. While the outer tube being turned, it rotates the turning tube, causing the lower protruded edge of the transmitting plate to right or left turn, and bringing down the ink cartridge along with the transmitting plate.

The image transmitting ball-point pen of the invention will be explained in great details with the aid of embodiments as illustrated in the drawings attached.

DETAILED DESCRIPTION OF THE INVENTION

Figure 1:
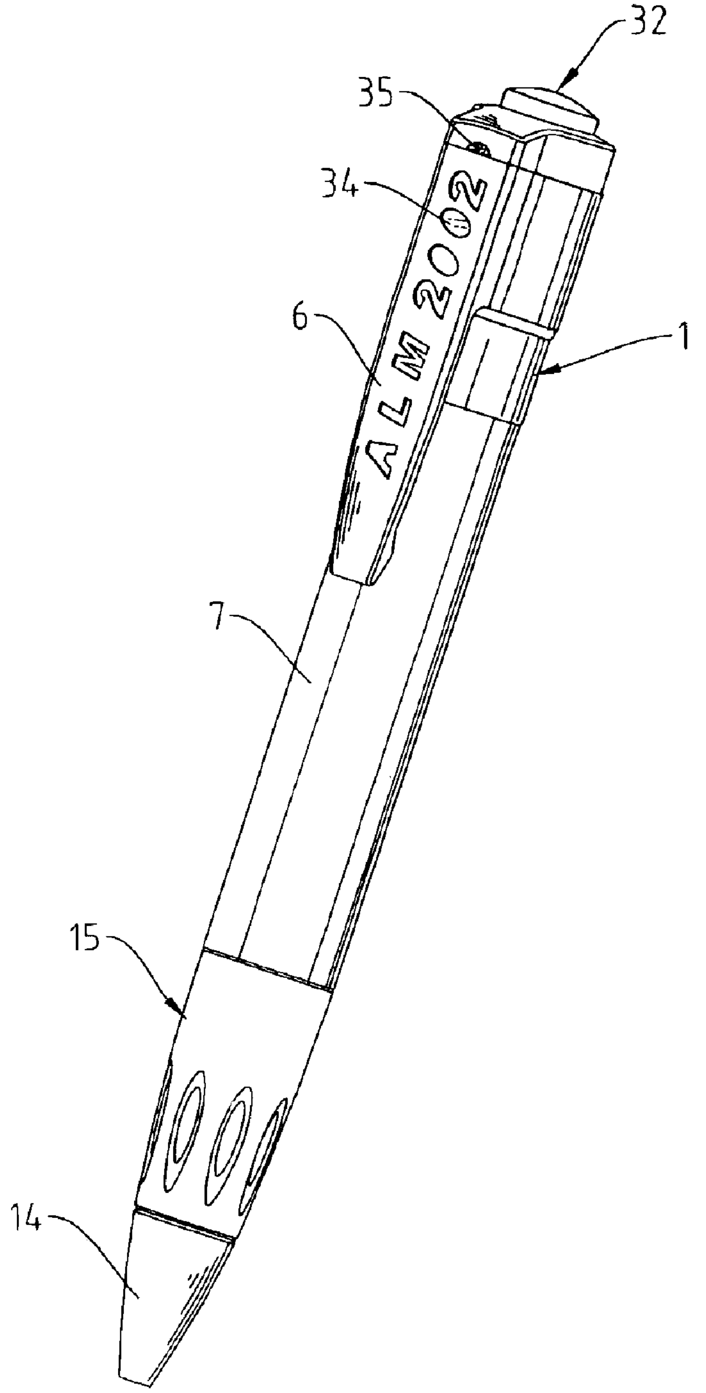
FIG. 1 is a stereo outlook of the image transmitting ball-point pen of this invention.
Figure 2:
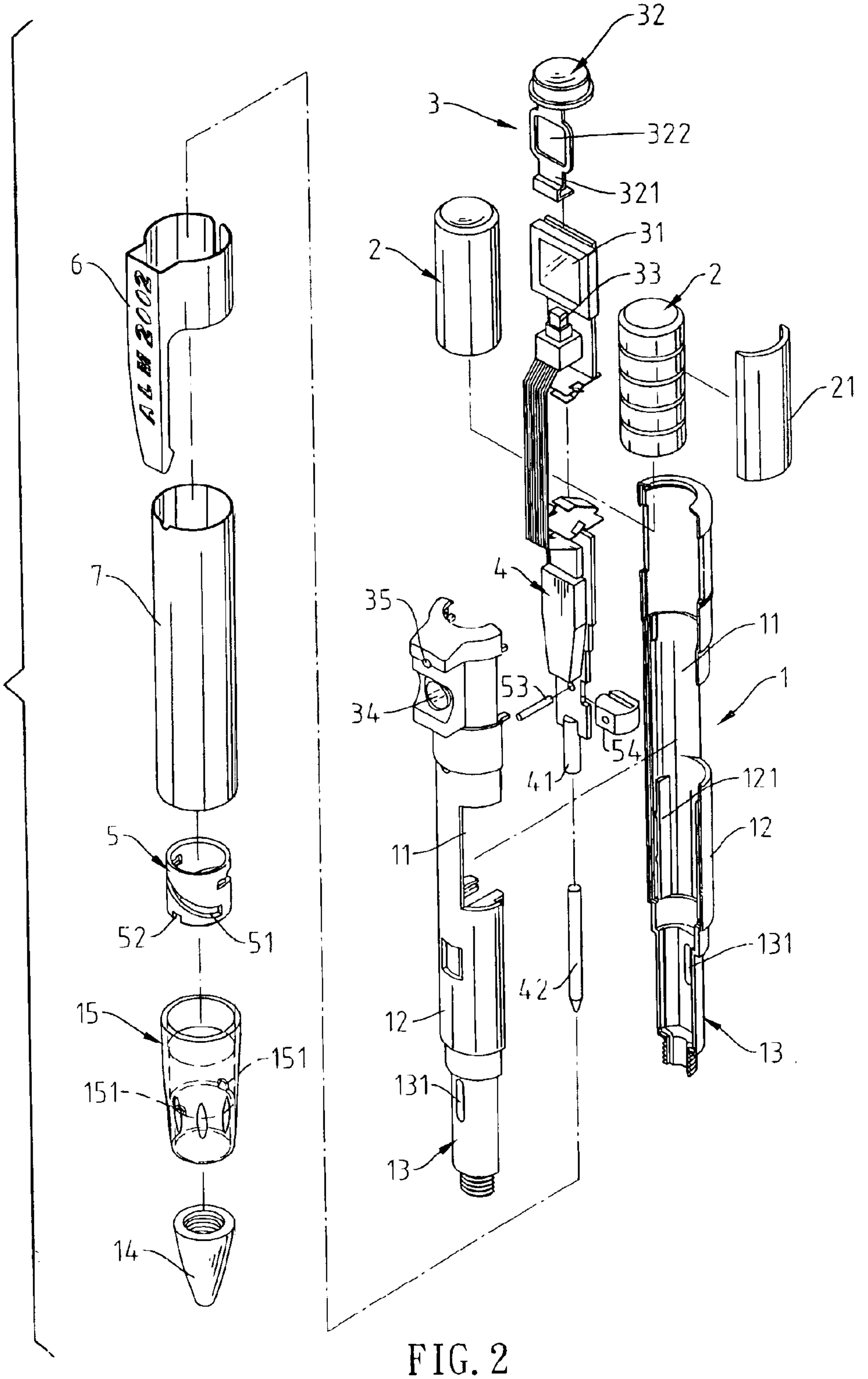
FIG. 2 is a disassembly of the image transmitting ball-point pen of this invention.
Figure 3:
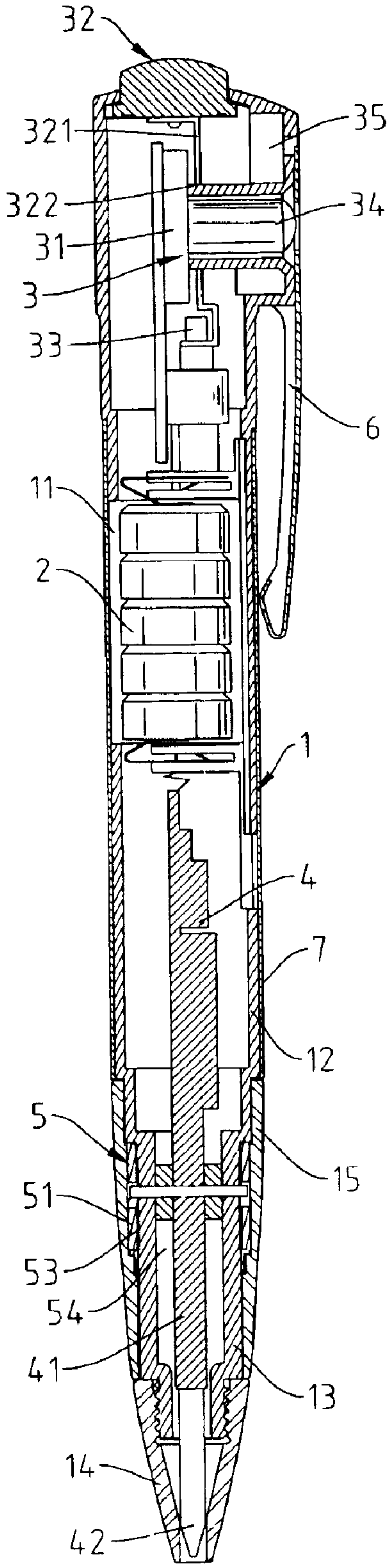
FIG. 3 is a section of an internal structure of the image transmitting ball-point pen of this invention.

As shown in FIGS. 1 through 3, the ball-point pen of the invention mainly comprises a barrel 1, a plurality of batteries

2, a camera 3, a transmitting plate 4, a turning sleeve 5, a clip 6 and decoration casing 7. The barrel constitutes the battery compartment 11, the lower body 12, the extension tube 13 and the tapered cap 14 locks onto the extension tube. The battery compartment 11 accommodates a plurality of dry batteries 2 or packed batteries 2 and sealed with a film of insulation 21 to prevent direct contact with the metal decoration casing 7.

The extension tube 13, directly underneath the lower body 12, has a smaller diameter than that of the lower body 12. The lower body 12 has two locating strips 121 therein, corresponding to two locating grooves 131 in the extension tube 13. The extension tube 13 is housed in the turning sleeve 5 and the outer tube 15. The turning sleeve 5 has a cut of two slide grooves 51 and a plurality of slots 52 on the lower rim to be locked in the protruded points 151 inside the outer tube 15 in an effort to prevent the outer tube 15 and turning sleeve 5 from falling off.

The lower body 12 and the extension tube 13 are designed to accommodate the transmitting plate 4, which has the terminal lug on four corners to be fitted into the locating strips 121 at the upper end and perfectly fixed into the locating grooves 131 of the extension tube 13 at the lower end. A lock pin 53 will pass the slide grooves 51 of the turning sleeve 5 and being locked onto the lock block 54 to link the turning sleeve 5 and the transmitting plate 4 firmly together.

The transmitting plate 4 provides a metal socket 41 to receive the ink cartridge formed the ink cartridge antenna 42. In addition to the writing function, the ink cartridge antenna 42, made of copper, can work as the antenna for the transmitting plate of the transmitter.

In photo taking operation, press down the button switch 32 of the camera 3, the connecting rod 321 will actuates the internal power switch 33 providing power to the image sensor 31 for photo taking. The connecting rod 321 has a hollow rectangular frame 322. After the button switch 32 is pressed down, the rectangular frame 322 is aligned in line with the image sensor 31 to prevent the image sensor 31 from being shielded by the connecting rod 321.

The transmitting plate 4 is especially designed with 2.4 GHZ frequency for wireless transmittance of image and sound signals in remote control with high reliability and resolution. The ink cartridge antenna 42 is designed with ¼ wave length and directly linked with the transmitting plate 4 to ensure the best reliability of signals transmitted.

The barrel 1 provides a clip 6 which works as a camouflage to cover up the lens 34 and the microphone 35 as well.

Figure 4:
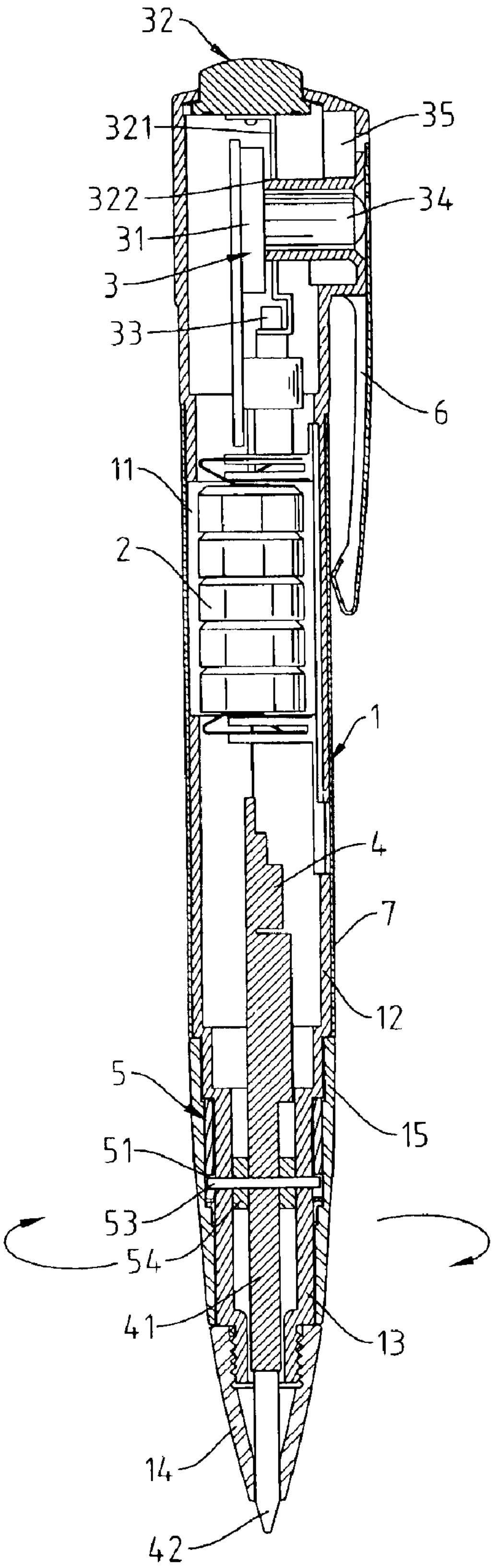
FIG. 4 is a schematic diagram in assembly of the image transmitting ball-point pen while in operation.
Figure 5:
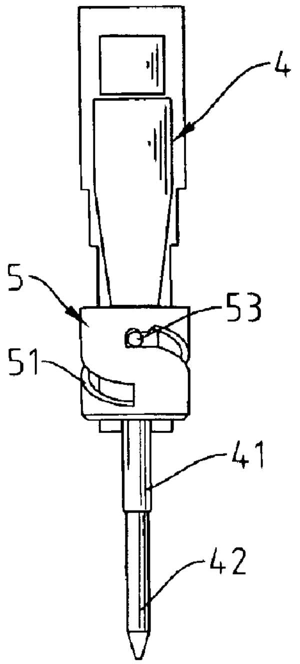
FIG. 5 shows an extension action of the ink cartridge of the image transmitting ball-point pen of the invention.
Figure 6:
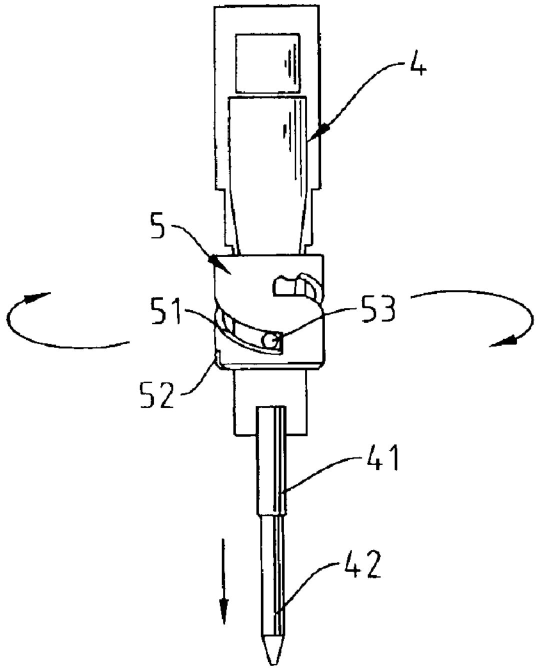
FIG. 6 shows a retracting action of the ink cartridge of the image transmitting ball-point pen of the invention.

Please refer to FIGS. 4 through 6 for the extending and retracting of the ink cartridge antenna 42. While the outer tube 15 is being turned, it acts on the turning sleeve 5 and the transmitting plate 4, which will move upward and downward along the locating strips 121, and the lock pin 53 moves in the locating grooves 131 of the extension tube 13. In short, while the outer tube 15 is turned leftward or rightward, the ink cartridge antenna 42 and the transmitting plate 4 move upward or downward simultaneously.

Figure 7:
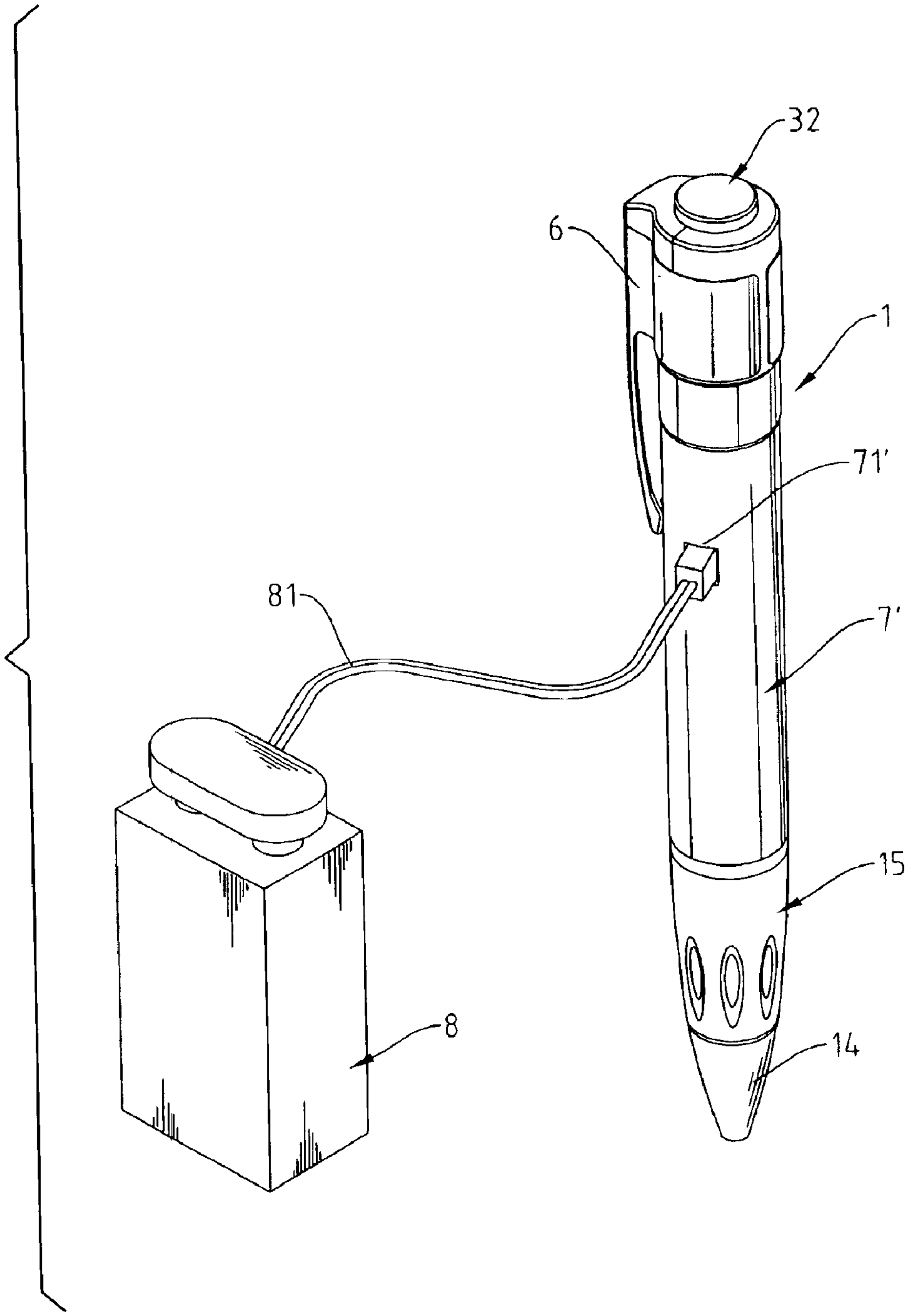
FIG. 7 shows a schematic diagram of the rechargeable battery used on the image transmitting ball-point pen.
Figure 8:
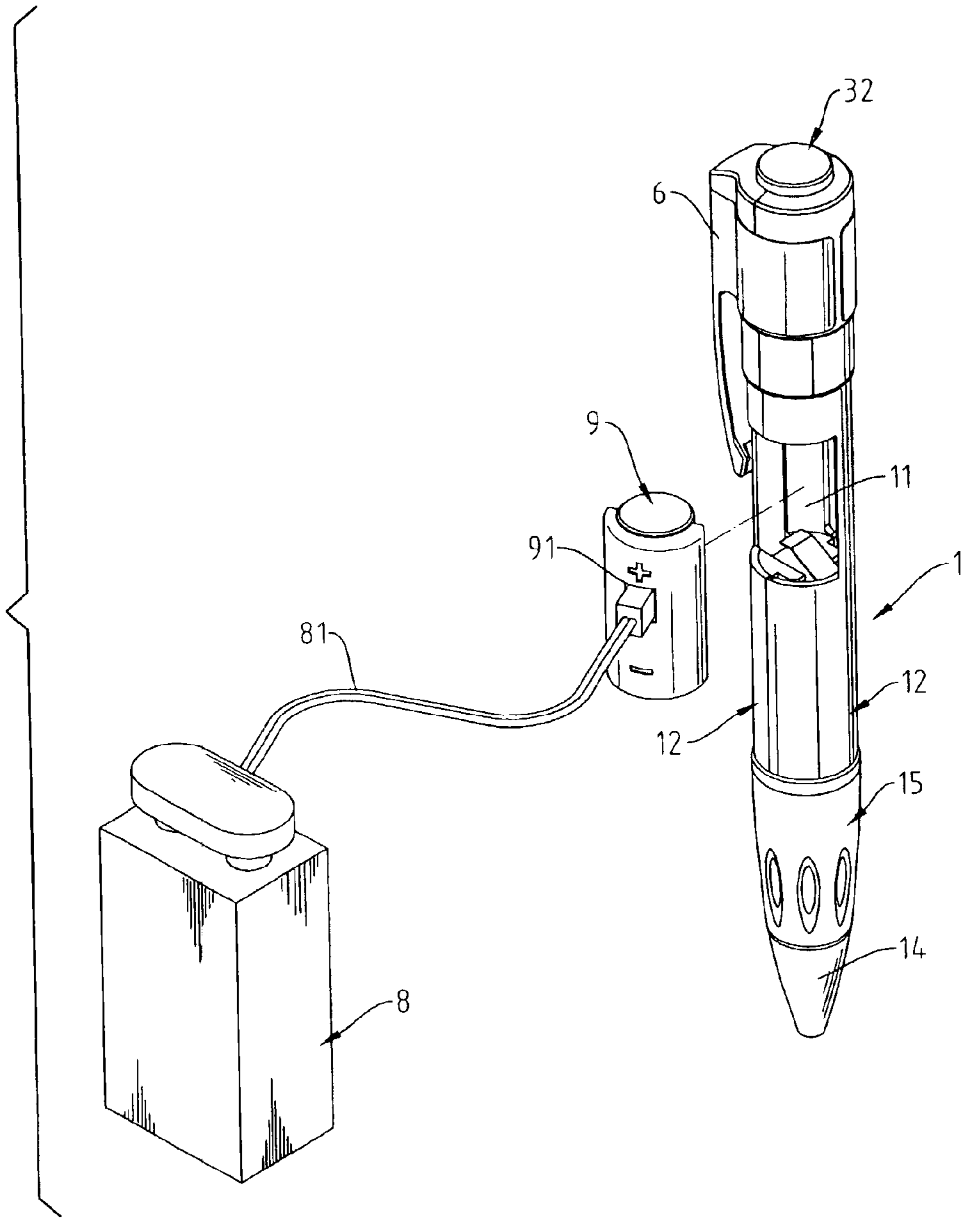
FIG. 8 shows a disassembly of rechargeable battery used on the image transmitting ball-point pen as shown in FIG. 7.

As shown in FIGS. 7 and 8, besides the mercury battery, the rechargeable battery 8 can be used to supply power for the image transmitting ball-point pen. That is, on the image transmitting ball-point pen, the battery compartment 11 provides a conductor 9, and the decoration casing 7' on the exterior of the barrel 1 has a socket 71' corresponding to the socket 91. The rechargeable battery 8, which is connected with the cable 81 plugged in the socket 91 of the conductor 9, can serve as a second power source for the image transmitting ball-point pen.

What is claimed is:

1. An image transmitting ball-point pen, mainly comprising:

a barrel consisting of two similar half cases, said barrel containing a battery compartment, a lower body and an extension tube, lower part of said extension tube locked with a taper cap, said battery compartment housing a plurality of batteries with a film of insulation protection, said lower body having two locating strips corresponding to locating grooves on said extension tube;

a camera device set on a top of said battery compartment, comprising an image sensor, lens, microphone, button switch and power switch, a connecting rod fixed between said image sensor and said lens, said connecting rod having a rectangular hollow frame permitting said frame aligned with said image sensor when said button switch being pressed down to prevent covering said image sensor, and power source being connected when said connecting rod being pressed on said power switch;

a transmitting plate placed between said locating strips of said lower body, at a lower end of said transmitting plate, a metal socket being provided to receive a copper ink cartridge antenna; and a turning sleeve having two slide grooves and a plurality of slots on a lower rim to be fitted with protruded points inside of an outer tube;

a decoration casing sleeved on an upper part of said barrel to cover said battery component and part of said barrel; said transmitting plate placed between said locating strips of said lower body, a lock pin passing and locking together said slide grooves of said turning sleeve and said locating grooves of said extension tube, while an outer tube being turned, corner lugs of said transmitting plate will move right or left, said transmitting plate move along said locating strips and said ink cartridge antenna extending or retracting.

2. The image transmitting ball-point pen of claim 1, wherein a clip of said barrel works as a camouflage to cover said lens of said camera and a microphone.

3. The image transmitting ball-point pen of claim 1, wherein said decoration casing with an opening is exactly aligned with said battery compartment.

4. The image transmitting ball-point pen of claim 3, wherein said battery compartment provides a conductor to replace a battery package, said conductor having a socket and a cable to connect to a rechargeable battery outside of said barrel as power supply for said image transmitting ball-point pen.

5. The image transmitting ball-point pen of claim 1, wherein said battery compartment provides a conductor to replace a battery package, said conductor having a socket and a cable to connect to a rechargeable battery outside of said barrel as power supply for said image transmitting ball-point pen.

* * * * *